Nov. 18, 1924.
I. C. WOODWARD
1,515,916
DIFFERENTIAL GEAR CONTROL MECHANISM
Filed Feb. 16, 1924
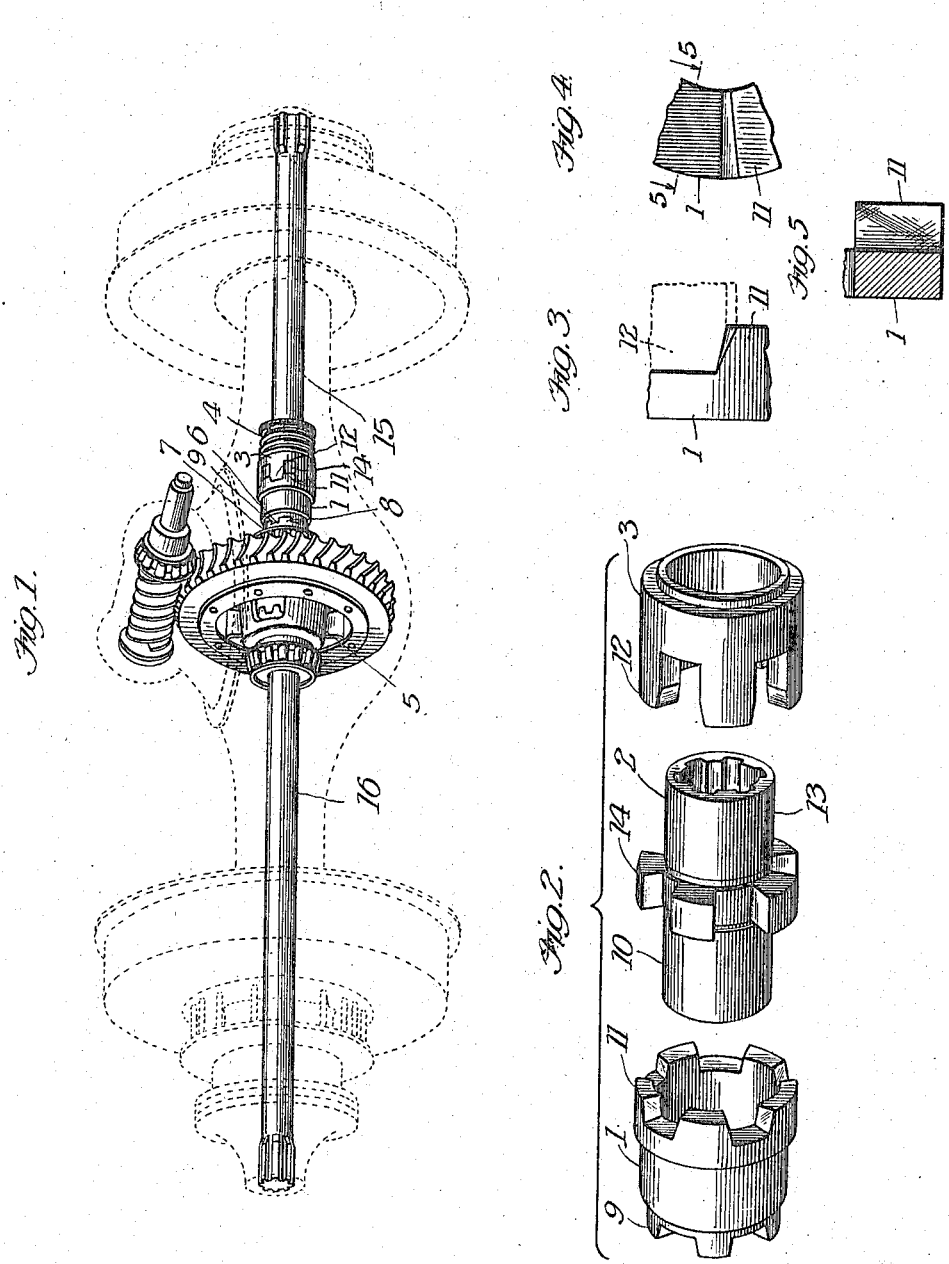
Inventor
Irving C. Woodward
By Rummler + Rummler
Attys
Witness
Martin H. Olsen.

Patented Nov. 18, 1924.

1,515,916

UNITED STATES PATENT OFFICE.

IRVING C. WOODWARD, OF SYRACUSE, NEW YORK.

DIFFERENTIAL-GEAR-CONTROL MECHANISM.

Application filed February 16, 1924. Serial No. 693,200.

*To all whom it may concern:*

Be it known that I, IRVING C. WOODWARD, a citizen of the United States of America, and a resident of Syracuse, county of Onondaga, and State of New York, have invented a new and useful Improvement in Differential-Gear-Control-Mechanism, of which the following is a specification.

This invention relates to differential gears as used in vehicle drive mechanisms and the purpose of the invention is to improve the operation and construction of the differential gear control mechanism described in applicant's Patent No. 1,355,297, of October 12, 1920.

The principle of the patented construction is the automatic retention of the differential gear unit against differential motion until the value of the torsional effort to differentiate between the driven axles reaches some predetermined amount. The patented construction makes use of a spring pressed toothed clutch element slidable along the splines of one of the driven axles into engagement with teeth cut in the hub of one side of the differential gear containing support or cover.

The present construction is of the same principle although the clutch element which is movable longitudinally along the driven axle is not splined to the axle but serves to connect a sleeve splined to the axle with the differential gear casing. The present invention further relates to an improved design of clutch tooth whereby proper contact is maintained between the teeth in a clutch when the teeth separate upon a predetermined torsional strain.

In the drawings:—

Figure 1 is a perspective view showing the clutch applied to the differential gearing of a vehicle.

Fig. 2 is a perspective view of the different elements of the control device in disassembled relation.

Figs. 3 and 4 are respectively fragmentary plan and face views showing the form of teeth of one of the clutch elements.

Fig. 5 is a sectional view taken along the line 5—5 of Fig. 4.

The construction as illustrated may be applied to differential gears as now employed in vehicle drive mechanisms without any substantial change in the mounting or construction of such gearing, the only change on the old mechanism required being a lengthening of one hub of the differential gear support or casing to provide for suitable means for securing thereto one element of the clutch mechanism. The length of the splines on one of the driven axles is also sometimes increased. The hub of the differential gear support is provided with teeth permanently in engagement with a sleeve surrounding the driven axle. This sleeve at its opposite end is provided with clutch teeth for coacting with clutch teeth on a member longitudinally slidable into engagement therewith. This last mentioned member is preferably slidable along a sleeve which has splined engagement with the driven axle and which has radially extending teeth whereby it may be interlocked with the slidable member. The slidable member is engaged by a spring and normally held by the spring in the clutching position.

The particular parts of the construction as numbered in the drawing comprises tubular clutch elements 1, 2, and 3 and the spring 4. The differential gearing to which the invention is applied and all other constructions related to the differential gearing are of the standard form now commonly employed in vehicle drive mechanisms, and therefore are not herein described. The casing or support 5 for the differential gearing has an elongated hub 6 passing through bearing 7. This hub has projecting teeth 8, cooperating with teeth 9 on the clutch element 1. This clutch element 1 fits over the tubular extension 10 of the clutch element 2, and the teeth 11 on the outer end of clutch element 1 cooperates with teeth 12 on clutch element 3. The clutch element 3 is supported upon a tubular extension 13 of clutch member 2, and the teeth project through radially extending teeth 14 on the clutch member 2. The clutch element 3 is slidable along the tubular extension 13 so that the teeth 12 may disengage from teeth 11, but always remain in engagement with teeth 14. Accordingly, since the central clutch member 2 is splined to the driven axle 15, the axle and members 2 and 3 always rotate as a unit. Normally, with the teeth 12 engaging teeth 11, the differential gear support also rotates with the driven axle, and, therefore, differential action does not take place because when there is differential action the driven axle rotates at a different rate than the differential casing 5. When the torsional effort to differentiate in speed between the two driven axles 15 and 16 is sufficient to overcome the effort of spring 4 and the frictional resistance of this control mechanism, the clutch element 3 is forced outwardly along the tubular extension 13 of clutch element 2 far enough to release clutch element 1 and the differential casing 5 connected therewith.

The central location of teeth 14 on clutch member 2 insures better average frictional contact between the splines on the shaft and on the part 2 than would be the case if these teeth were at one end of part 2, and the use of this intermediate member 2 obviates the necessity of any sliding motion along the splines of the axle. The axle is not quite so hard as the clutch parts, and for this reason is not so well adapted to resist the wearing effect of a sliding element along its splines as the larger diameter of the clutch elements is able to take care of. The tapered teeth 11 and 12 are so cut as to insure good surface contact between the teeth at any point of engagement. These teeth are cut by a tool moving at right angles to the axis of the clutch members while these members are fed forward and turned on their axes. The sides of the teeth 11 and 12, therefore, have surfaces corresponding to what is known as a warped surface.

The operation of the control mechanism is wholly automatic. In the patented construction above referred to the clutches could be disengaged by manually operated means extending from the clutch to a convenient position for operation by the driver of the vehicle. In the present case, the differential gearing is always under the restraint of the spring pressed clutch, except when this clutch is forced outwardly by the automatic effort to differentiate between the two wheels when the vehicle is making a turn. At other times the wheels will be driven at the same rate regardless of whether one has better traction than the other, so long as the vehicle is being driven in a straight path.

Although but one specific embodiment of this invention has been herein shown and described, it will be understood that details of the construction shown may be altered or omitted without departing from the spirit of this invention as defined by the following claims.

I claim:

1. The combination with a driving member and a driven member of a clutch for connecting said members, said clutch comprising a toothed element rotating with the driving member, a toothed element rotating with the driven member, and a third toothed element movable axially with respect to said two first mentioned toothed elements and having teeth for interlocking with the teeth on both of said two first mentioned toothed elements.

2. The combination with a driving member and a driven member of a clutch for connecting said members, said clutch comprising a toothed element rotating with the driving member, a toothed element rotating with the driven member, a third toothed element movable axially with respect to said two first mentioned toothed elements and having teeth for interlocking with the teeth on both of said two first mentioned toothed elements, and a spring for normally holding said elements in engaging position.

3. A device of the class described, comprising a driving member, a driven shaft, a tubular element mounted on said shaft to rotate therewith, said tubular element having radially extending teeth centrally located thereon, a toothed member slidably mounted on one end of the member having the radial teeth, the teeth of which are long enough to project through the radial teeth, and teeth on said driving member in position to coact with the teeth on said slidable member.

4. In a control mechanism of the class described, the combination with differential gearing and a shaft driven thereby, of a toothed member concentric with said driven shaft and rotatable with the differential gearing, a coacting toothed member axially slidable with respect to said driven shaft into and out of engagement with the teeth on said first mentioned toothed member, a member rotatable with said shaft and having radially extending teeth, which teeth extend outwardly between the teeth on said axially movable member, and a spring for urging said axially movable member into engaging position.

5. The combination with differential gearing having a supporting casing rotatable therewith, of a pair of shafts driven thereby, means for connecting one of said shafts with the differential gear supporting casing, said means comprising a tubular element splined to the shaft and having radiating teeth, a clutch element slidable on said tubular member and having teeth projecting through the teeth on said tubular member, means on said differential gear casing for coacting with teeth on said slidable clutch element, and a spring for normally urging said slidable clutch element into engagement with said coacting means on the differential gear casing.

Signed at Syracuse this fourth day of February, 1924.

IRVING C. WOODWARD.